US008024176B2

(12) United States Patent
Carus et al.

(10) Patent No.: US 8,024,176 B2
(45) Date of Patent: Sep. 20, 2011

(54) SYSTEM, METHOD AND APPARATUS FOR PREDICTION USING MINIMAL AFFIX PATTERNS

(75) Inventors: Alwin B. Carus, Waban, MA (US); Thomas J. Deplonty, III, Melrose, MA (US)

(73) Assignee: Dictaphone Corporation, Stratford, CT (US)

( * ) Notice: Subject to any disclaimer, the term of this patent is extended or adjusted under 35 U.S.C. 154(b) by 2189 days.

(21) Appl. No.: 10/787,889

(22) Filed: Feb. 27, 2004

(65) Prior Publication Data

US 2005/0120020 A1 Jun. 2, 2005

(51) Int. Cl.
*G06F 17/27* (2006.01)

(52) U.S. Cl. .................. 704/9; 704/1; 704/10; 707/706; 707/707; 707/708; 707/711; 715/256; 715/259

(58) Field of Classification Search .................. 704/1, 9, 704/10; 707/711, 706–708; 715/256, 259
See application file for complete search history.

(56) References Cited

U.S. PATENT DOCUMENTS

| | | | |
|---|---|---|---|
| 4,477,698 A | 10/1984 | Szlam et al. | |
| 4,965,763 A | 10/1990 | Zamora | |
| 5,253,164 A | 10/1993 | Holloway et al. | |
| 5,325,293 A | 6/1994 | Dorne | |
| 5,327,341 A | 7/1994 | Whalen et al. | |
| 5,392,209 A | 2/1995 | Eason et al. | |
| 5,544,360 A | 8/1996 | Lewak et al. | 707/1 |
| 5,664,109 A | 9/1997 | Johnson et al. | |
| 5,794,177 A * | 8/1998 | Carus et al. | 704/9 |
| 5,799,268 A | 8/1998 | Boguraev | |
| 5,805,911 A * | 9/1998 | Miller | 715/234 |
| 5,809,476 A | 9/1998 | Ryan | |
| 5,832,450 A | 11/1998 | Myers et al. | 705/3 |
| 5,890,103 A * | 3/1999 | Carus | 704/9 |
| 5,953,006 A * | 9/1999 | Baker et al. | 715/700 |
| 5,970,463 A | 10/1999 | Cave et al. | |
| 6,014,663 A | 1/2000 | Rivette et al. | |
| 6,021,202 A | 2/2000 | Anderson et al. | |
| 6,052,693 A | 4/2000 | Smith et al. | |
| 6,055,494 A | 4/2000 | Friedman | |
| 6,088,437 A | 7/2000 | Amick | |
| 6,182,029 B1 | 1/2001 | Friedman | |
| 6,192,112 B1 | 2/2001 | Rapaport et al. | |
| 6,292,771 B1 | 9/2001 | Haug et al. | |
| 6,347,329 B1 | 2/2002 | Evans | |
| 6,405,165 B1 | 6/2002 | Blum et al. | |
| 6,434,547 B1 | 8/2002 | Mishelevich et al. | |

(Continued)

OTHER PUBLICATIONS

F. Song et al., A Graphical Interface to a Semantic Medical Information System, *Journal of Foundations of Computing and Decision Sciences*, 22(2), 1997.

(Continued)

*Primary Examiner* — David R Hudspeth
*Assistant Examiner* — Lamont Spooner
(74) *Attorney, Agent, or Firm* — Wolf, Greenfield & Sacks, P.C.

(57) ABSTRACT

One embodiment generally pertains to a method of prediction. The method includes generating a set of affixes from a selected input sequence and comparing the set of affixes with a predictive set of affixes. The method also includes selecting an affix from the predictive set of affixes. The invention uses various input data sets and allows the ability to perfectly render the original data set and the minimal size of the predictive set of affixes.

36 Claims, 7 Drawing Sheets

U.S. PATENT DOCUMENTS

| | | | |
|---|---|---|---|
| 6,438,533 | B1 | 8/2002 | Spackman et al. |
| 6,553,385 | B2 | 4/2003 | Johnson et al. ............ 707/104.1 |
| 6,571,313 | B1* | 5/2003 | Filippi et al. .................. 711/108 |
| 6,768,991 | B2* | 7/2004 | Hearnden ...................... 707/778 |
| 6,785,699 | B1* | 8/2004 | Andreev et al. ............... 708/212 |
| 6,915,254 | B1 | 7/2005 | Heinze et al. ...................... 704/9 |
| 6,947,936 | B1 | 9/2005 | Suermondt et al. ................ 707/7 |
| 7,039,636 | B2* | 5/2006 | Tada et al. ............................. 1/1 |
| 7,120,582 | B1* | 10/2006 | Young et al. .................. 704/255 |
| 7,124,144 | B2 | 10/2006 | Christianson et al. ........ 707/102 |
| 7,349,840 | B2* | 3/2008 | Budzinski ......................... 704/9 |
| 7,634,500 | B1* | 12/2009 | Raj ....................................... 1/1 |
| 2002/0007285 | A1 | 1/2002 | Rappaport ........................ 705/2 |
| 2002/0095313 | A1 | 7/2002 | Haq ................................. 705/2 |
| 2002/0143824 | A1 | 10/2002 | Lee et al. ....................... 707/523 |
| 2002/0169764 | A1 | 11/2002 | Kincaid et al. ..................... 707/3 |
| 2003/0046264 | A1 | 3/2003 | Kauffman ........................ 707/1 |
| 2003/0061201 | A1 | 3/2003 | Grefenstette et al. ............. 707/3 |
| 2003/0115080 | A1 | 6/2003 | Kasravi et al. .................... 705/1 |
| 2003/0187856 | A1* | 10/2003 | Luk et al. ...................... 707/100 |
| 2003/0208382 | A1 | 11/2003 | Westfall ............................ 705/3 |
| 2003/0233345 | A1 | 12/2003 | Perisic et al. ...................... 707/3 |
| 2004/0103075 | A1 | 5/2004 | Kim et al. ......................... 707/1 |
| 2004/0139400 | A1 | 7/2004 | Allam et al. .................. 715/526 |
| 2004/0186746 | A1 | 9/2004 | Angst et al. ....................... 705/3 |
| 2004/0220895 | A1 | 11/2004 | Carus et al. |
| 2004/0243545 | A1 | 12/2004 | Boone et al. |
| 2004/0243551 | A1 | 12/2004 | Boone et al. |
| 2004/0243552 | A1 | 12/2004 | Titemore et al. |
| 2004/0243614 | A1 | 12/2004 | Boone et al. |
| 2005/0108010 | A1 | 5/2005 | Frankel et al. |
| 2005/0114122 | A1 | 5/2005 | Uhrbach et al. |
| 2005/0120300 | A1 | 6/2005 | Schwager et al. |
| 2005/0144184 | A1 | 6/2005 | Carus et al. |

OTHER PUBLICATIONS

F. Song et al., A Cognitive Model for the Implementation of Medical Problem Lists, *Proceedings of the First Congress on Computational Medicine, Public Health and Biotechnology*, Austin, Texas, 1994.

F. Song et al., A Graphical Interface to a Semantic Medical Information System, *Karp-95 Proceedings of the Second International Symposium on Knowledge Acquisition*, Representation and Processing, pp. 107-109, 1995.

*Epic Web Training Manual*, pp. 1-33, 2002.

B. Hieb, Research Note, NLP Basics for Healthcare, Aug. 16, 2002.

M. Lee et al., Cleansing Data for Mining and Warehousing, Lecture Notes in Computer Science vol. 1677 archive, *Proceedings of the 10th International Conference on Database and Expert Systems Applications*, pp. 751-760, Springer-Verlag, London, 1999.

C. Van Rijsbergen, *Information Retrieval*, 2nd Ed., Ch. 5, Butterworths, London, 1979.

W. Gale et al., Discrimination Decisions for 100,000-Dimensional Spaces, *Current Issues in Computational Linguistics*, pp. 429-450, Kluwer Academic Publishers, 1994.

W. Daelemans et al., TiMBL: Tilburg Memory Based Learner, version 5.0, Reference Guide, ILK *Research Group Technical Report Series No. 04-02 (ILK-0402)*, ILK Research Group, Tilburg University, Tilburg, Netherlands, 2004.

Case Study: Massachusetts Medical Society http://www.microsoft.com/resources/casestudies/CaseStudy.asp?CaseStudyID=14931 posted Jan. 13, 2004.

W. Braithwaite, Continuity of Care Record (CCR) http://www.h17.org/library/himss/2004Orlando/ContinuityofCareRecord.pdf.

C. Waegemann, EHR vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://www.kryptiq.com/News/PressReleases/27.html posted Feb. 17, 2004.

Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.

Continuity of Care Record, American Academy of Family Physicians, http://www.aafp.org/x24962.xml?printxml posted Nov. 12, 2003.

Continuity of Care Record (CCR), AAFP Center for Health Information Technology, http://www.centerforhit.org/x201.xml posted Aug. 20, 2004.

Core Measures web page, Joint Commission on Accreditation of Healthcare Organizations, http://www.jcaho.org/pms/core+measures/ printed Mar. 22, 2004.

Code Information and Education web page, American Medical Association, http://www.ama-assn.org/ama/pub/category/3884.html printed Mar. 22, 2004.

Category III CPT Codes, American Medical Association, http://www.ama-assn.org/ama/pub/article/3885-4897.html printed Mar. 22, 2004.

ICD-9-CM Preface (FY04), http://ftp.cdc.gov/pub/Health_Statistics/NCHS/Publications/ICD9-CM/2004/Prefac05.RTF.

*ICD-9-CM Official Guidelines for Coding and Reporting*, effective Oct. 1, 2003.

Q. X. Yang et al., "Faster algorithm of string comparison," *Pattern Analysis and Applications*, vol. 6, No. 1, Apr. 2003: pp. 122-133.

U.S. Appl. No. 11/068,493, Carus, et al.
U.S. Appl. No. 10/953,471, Cote, et al.
U.S. Appl. No. 11/069,203, Cote, et al.
U.S. Appl. No. 11/007,626, Cote, et al.
U.S. Appl. No. 10/840,428, Carus, et al.
U.S. Appl. No. 10/951,281, Cote, et al.

"Hardware Reference Manual," Release 3 for DOS, revised Jan. 1994, PIKA Technologies, Inc., Ontario, Canada, available at http://www.pikatechnologies.com/downloads/legacy/AVA%20B-Series%20Hardware%20Manual.pdf (last accessed Jul. 25, 2005).

"Customizing D/41 Call Analysis," date unknown, Intel Corp., Santa Clara, California, available at http://resource.intel.com/telecom/support/appnotes/custd41d.htm (last accessed Jul. 25, 2005).

Brill, E., "Some Advances in Transformation-Based Part of Speech Tagging," AAAI 1994 Proceedings of 12th National Conference on Artificial Intelligence, vol. 1, pp. 722-727, 1994.

Continuity of Care record (CCR): The Concept Paper of the CCR, v.2.1b, ASTM International and Massachusetts Medical Society, ASTM E31.28, Nov. 17, 2003 http//www.bhtinfo.com/CCR.Concept%20Paper.1.5.doc.

Cutting et al., "A Practical Part-of-Speech Tagger," ANLC '92 Proceedings 3rd Conference on Applied Natural Language Processing, 1992, pp. 133-140.

Day, J., Extracting Knowledge from Text Using Learning by Constraint Relaxation (LCR), CSI, www.csi-inc.com/CSI/pdf/jday_icim02.pdf, downloaded Nov. 21, 2002.

Nevill-Manning, C. et al., "The Development of Holte's 1R Classifier," 2nd New Zealand Two-Stream International Conference on Artificial Neural Networks and Expert Systems (ANNES '95), Dunedin, New Zealand Nov. 20-23, 1995.

Nivre, J., "DAC723: Language Technology Finite State Morphology," Vaxjo University of Mathematics and Systems Engineering, pp. 1-11, Oct. 2001.

Specification Manual for National Implementation of Hospital core Measures, v.2.0, Joint Commission on Accreditation of Healthcare Organizations, 2003 http://www.jcaho.org/pms/core+measures/information+on+final+specifications.htm.

Zavrel et al., "Recent Advances in Memory-Based Part-of-Speech Tagging," 6th International Symposium on Social Communication, Santiago, Cuba 1999, pp. 590-597.

\* cited by examiner

300

500

SYSTEM, METHOD AND APPARATUS FOR PREDICTION USING MINIMAL AFFIX PATTERNS

CROSS-REFERENCE TO RELATED APPLICATIONS

This application relates to co-pending U.S. patent application Ser. No. 10/447,290, entitled "SYSTEM AND METHODS UTILIZING NATURAL LANGUAGE PATIENT RECORDS," filed on May 29, 2003; U.S. patent application Ser. No. 10/413,405, entitled "SYSTEMS AND METHODS FOR CODING INFORMATION," filed Apr. 15, 2003, now U.S. Pat. No. 7,233,938; U.S. patent application Ser. No. 11/068,493, entitled "A SYSTEM AND METHOD FOR NORMALIZATION OF A STRING OF WORDS," filed on Feb. 28, 2005, now U.S. Pat. No. 7,822,598; co-pending U.S. patent application Ser. No. 10/448,320, entitled "METHOD, SYSTEM, AND APPARATUS FOR DATA REUSE," filed on May 30, 2003; co-pending U.S. patent application Ser. No. 10/448,317, entitled "METHOD, SYSTEM, AND APPARATUS FOR VALIDATION," filed on May 30, 2003; U.S. patent application Ser. No. 10/448,325, entitled "METHOD, SYSTEM, AND APPARATUS FOR VIEWING DATA," filed on May 30, 2003, now abandoned; U.S. patent application Ser. No. 10/953,448, entitled "SYSTEM AND METHOD FOR DOCUMENT SECTION SEGMENTATIONS," filed on Sep. 30, 2004, now abandoned; U.S. patent application Ser. No. 10/953,471, entitled "SYSTEM AND METHOD FOR MODIFYING A LANGUAGE MODEL AND POST-PROCESSOR INFORMATION," filed on Sep. 29, 2004, now U.S. Pat. No. 7,774,196; U.S. patent application Ser. No. 10/951,291, entitled "SYSTEM AND METHOD FOR CUSTOMIZING SPEECH RECOGNITION INPUT AND OUTPUT," filed on Sep. 27, 2004, now U.S. Pat. No. 7,860,717; co-pending U.S. patent application Ser. No. 10/953,474, entitled "SYSTEM AND METHOD FOR POST PROCESSING SPEECH RECOGNITION OUTPUT," filed on Sep. 29, 2004; U.S. patent application Ser. No. 10/951,281, entitled "METHOD, SYSTEM AND APPARATUS FOR REPAIRING AUDIO RECORDINGS," filed on Sep. 27, 2004, now U.S. Pat. No. 7,542,909; U.S. patent application Ser. No. 11/069,203, entitled "SYSTEM AND METHOD FOR GENERATING A PHASE PRONUNCIATION," filed on Feb. 28, 2005, now U.S. Pat. No. 7,783,474; U.S. patent application Ser. No. 11/007,626, entitled "SYSTEM AND METHOD FOR ACCENTED MODIFICATION OF A LANGUAGE MODEL," filed on Dec. 7, 2004, now U.S. Pat. No. 7,315,811; co-pending U.S. patent application Ser. No. 10/948,625, entitled "METHOD, SYSTEM, AND APPARATUS FOR ASSEMBLY, TRANSPORT AND DISPLAY OF CLINICAL DATA," filed on Sep. 23, 2004; and U.S. patent application Ser. No. 10/840,428, entitled "CATEGORIZATION OF INFORMATION USING NATURAL LANGUAGE PROCESSING AND PREDEFINED TEMPLATES," filed on Sep. 23, 2004, now U.S. Pat. No. 7,379,946, all of which are hereby incorporated by reference in their entirety.

BACKGROUND OF THE INVENTION

The present invention relates to an apparatus, system, and method for predicting and accurately reproducing linguistic properties of character and word sequences using techniques involving affix data preparation, generation, and prediction.

Automated document preparation systems have been available for some time. These systems allow a plurality of individuals to dictate information to a transcription center where the dictated information is stored, transcribed and processed for distribution in accordance with a predetermined arrangement. Such systems are commonly employed in the healthcare industry where physicians, nurses and other medical professionals are required to maintain detailed records relating to the status of the many patients they see during the course of their daily routine.

As with virtually all industries, the healthcare industry in particular is beset by a need for readily available information. From physicians to patients the ready availability of information is somewhat limited when one looks to the availability of information in other fields. While much of the known scientific information relating to medicine is available via public and/or private databases, the manner in which the data is gathered and analyzed is very similar to methods which have been utilized since the development of the printing press.

That is, physicians typically conduct research on an individual basis and publish reports telling of the information they have found through their research. The basis for their research is, however, usually information of which they have first hand knowledge or information which has been previously published by other physicians.

In addition to the limited availability of information for use by physicians, the available information regarding the practice of medicine is stored and prepared in an arcane manner not readily understandable by the conventional patient. As such, medical patients are often forced to rely entirely upon information given to them by their personal physicians, and consequently overlook alternate procedures which may be preferable to those suggested by their personal physician.

Automated document preparation systems for some time have incorporated natural language processing to enhance document processing and information retrieval. For example, a natural language processor linked with a text normalization processor may be configured to compile relevant information related to reports generated by an automated document preparation system. The relevant information may be information related to diagnosis of diseases, treatment protocols, billing codes and the like. The relevant information may be compiled and indexed for later retrieval and research.

In the conventional natural language processors, morphological analysis and stemming techniques have been implemented to enhance natural language processing and information retrieval. Morphological analysis may include inflectional and derivational of natural language text. More particularly, inflectional analysis may involve determining patterns in paradigms and derivational analysis may involve the process of word formation. Computational methods applied to morphological analysis and generation in natural language parsing; text generation; machine translation; dictionary tools; text-to-speech and speech recognition; word processing; spelling checking; text input; information retrieval, summarization, and classification; and information extraction.

However, drawbacks and disadvantages are associated with the text processing engines. For example, the conventional information extraction engine is typically constructed using databases or tables of terms. In the medical fields, these tables often encompass several million of terms (words and phrases). The size of these tables not only encumbers computer memory resources, but also encumbers the performance of the normalization engine. More specifically, as the tables grow larger, the time required to search the tables grows larger. It would also be desirable to apply the same generation and prediction methods for a number of information extraction processing steps such as uninflection, underivation, and part-of-speech prediction; and for these methods to work equally well over words and phrases. The problem of processing text is burdened by the fact that it is not possible to list all possible terms. Consequently, prediction technology should not only provide precise information about the terms of which it has direct knowledge, but also be able to accurately predict information for novel or out-of-vocabulary terms.

Several shortcomings of the prior art that are addressed by the patent are: (a) enforcing the requirement that the prediction method is capable of perfectly rendering information supplied by the data set used to generate the predictor; (b) providing a method of excluding data from the generation process; (c) providing a method of incorporating exceptional data into the generation process; and, thereby, (d) providing the ability either to replace completely the original data set or to combine perfect rendition of the information in a data set and highly accurate prediction for novel or out-of-vocabulary terms.

SUMMARY OF THE INVENTION

One embodiment generally pertains to a method of prediction. The method includes generating an ordered set of affixes from a selected input sequence and comparing the set of affixes with a stored set of affixes. The method also includes selecting an affix from the stored set of affixes used for prediction; and retrieving the prediction associated with that affix. In the following presentation, the term "affix" is used to refer to suffixes (trailing sequences), prefixes (leading sequences), and infixes (interior sequences) and their combinations.

Another embodiment generally relates to a method for generating a data set. The method includes receiving a corpus (organized set of texts) and generating a set of data triplets based on the corpus. Each triplet consists of an affix, an associated pattern, and a frequency of occurrence for the affix and associated pattern. The method also includes selecting a subset of triplets as the data set, where a selection criteria is based on length and frequency of occurrence.

Yet another embodiment generally relates to a system for predicting a pattern using affixes. The system includes an affix prediction module, an affix prediction data set, and an affix generation module. The affix prediction module is configured to retrieve terms based on matching affixes generated from an input sequence with entries in the affix prediction data set generated by the affix generation module.

Yet another embodiment generally pertains to an apparatus for generating a data set. The apparatus includes means for receiving a corpus comprising of a plurality of sequences and means for generating a set of triplets based on the corpus. Each triplet has an affix, an associated pattern, and a frequency of occurrence for the affix and associated pattern. The apparatus also includes means for selecting a subset of triplets as the data set, where a selection criteria is based on length and frequency of occurrence.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE EMBODIMENTS

The present disclosure will now be described more fully with reference the to the Figures in which an embodiment of the present disclosure is shown. The subject matter of this disclosure may, however, be embodied in many different forms and should not be construed as being limited to the embodiments set forth herein.

Figure 1:
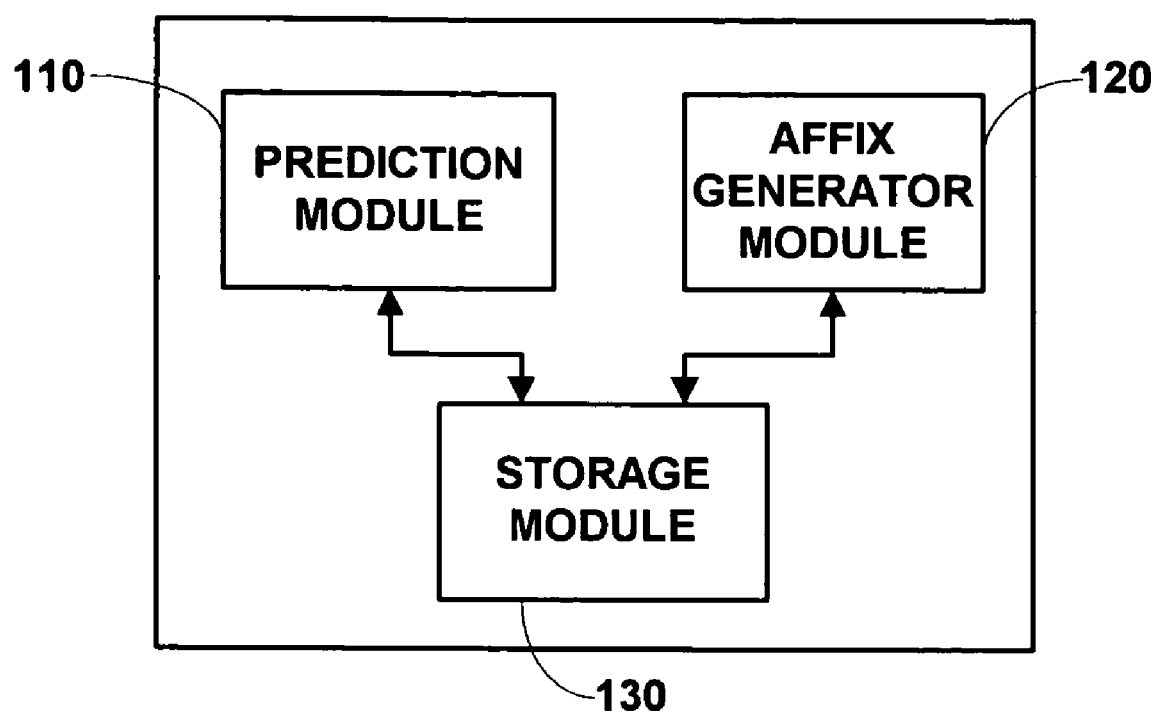
FIG. 1 illustrates a block diagram of the affix prediction module in accordance with an embodiment of the invention.

FIG. 1 illustrates a block diagram of an affix prediction module 100 in accordance with an embodiment of the present invention. It should be readily apparent to those of ordinary skill in the art that the affix prediction module 100 depicted in FIG. 1 represents a generalized schematic illustration and that other components may be added or existing components may be removed or modified. Moreover, the affix prediction module 100 may be implemented using software components, hardware components, or a combination thereof.

As shown in FIG. 1, the affix prediction module 100 includes a prediction module 110, an affix generation module 120, and a storage module 130. The prediction module 110 may be configured to make predictions based on a sequence of letters, words, tokens, etc. This sequence, i.e., affix, may consist of a combination of prefix, infix, and suffix sequences drawn from the input sequence. The prediction module 110 may utilize an affix prediction data set, stored on the storage module 130. More particularly, the prediction module 110 may process input sequences from an input file in one embodiment. In other embodiments, the input sequences may be provided over a network.

The prediction module 110 may generate all possible affixes for the selected input sequence. The prediction module 110 may compare the generated affixes with affixes stored in the affix prediction data set, which is may be stored on the storage module 130. When the prediction module 110 determines a match between the longest affix of the input sequence with an affix in the affix prediction data set, the prediction module 110 retrieves the pattern and/or action associated with the matching affix. In one embodiment, the affix may represent an electronic mail address and the action may initiate the loading of an electronic mail client with the affix.

The affix generation module 120 may be configured to generate three data sets: a master data set, an excluded data set, and an add-in data set. Each data set comprises of entries of triplets. A triplet consists of an affix form, i.e., an ordered sequence of characters or words, a pattern, i.e., an attribute, property, or action associated with the associated affix form, and a frequency, which is derived or estimated frequency of occurrence of the form-pattern combination.

The master data set is configured to provide a basis for pattern generation, which is used to generate the affix prediction data set. The excluded data set is configured to provide a subset of triplets from the master data set that are not intended to undergo pattern generation. The excluded data set may be utilized under some circumstances to ensure that irrelevant affixes are not generated for non-productive data types. For example, a closed set of function words (prepositions, conjunctions, pronouns, article, and so forth) in a natural language may be excluded from the generation of part-of-speech prediction patterns for content words (nouns, verbs, adjectives, and adverbs). The add-in data set is configured to contain a set of triplets that are added "as-is" to the affix prediction data set. The add-in data set is used to incorporate exceptions into the affix prediction data set. In certain embodiments, the affix prediction data set may be generated based on the master data set alone or in combination with the excluded data set or add-in data set. The actual combination of data set may depend on the requirements of a particular application for the natural language processor.

The affix generation module 120 may be configured to receive the master data set, i.e., a corpus of organized set of texts, a vocabulary or lexicon, or other similar input, to generate the affix prediction data set. The affix generation module 120 may also be configured to receive a set of parameters, e.g., the length of the longest affix, lowest frequency affix-pattern combination, etc., associated with the predicted affix set. The affix generation module 120 may pre-process the master data set by pre-pending and/or post-pending each term in the master data set with a distinctive peripheral symbol (the symbol being different from any possible character or word) to identify the beginning and the end of a sequence.

The affix generation module 120 may be further configured to generate triplets for the characters and/or words of on the master data set and, optionally, the application of either the excluded data set or the add-in data set or both. More particularly, the affix generation module 120 may generate sequences of characters in a predefined order, i.e., an affix, from the characters and/or words of the master data set. For each sequence, the affix generation module 120 may determine an associated pattern of the affixes, and the frequency of the affix-pattern combination. In one embodiment, the affix generation process may incorporate a shortest pattern consisting of the distinctive peripheral symbol for each member of the corpus. The default prediction (i.e., when no non-empty affix matches) is provided by this special affix. In other embodiments, the affix generation module 120 may eliminate an affix-combination pattern if it is longer than the pre-determined longest affix.

The affix generation module may be further configured to maintain the frequency of each affix-pattern combination by keeping a count of the frequency of each affix-pattern combination and adding to the count for every new instance of that affix-pattern combination. In further embodiments, the affix generation module may eliminate affix-pattern combinations for those combinations, which fall below the predetermined lower frequency pattern combination.

The affix generation module 120 may yet be further configured to select a subset of the generated triplets. More particularly, the affix generation module 120 may sort all triplets based on length of affix, the frequency, i.e., from shortest to longest affix and from lowest to highest frequency. The affix generation module 120 may then start from the shortest affix to determine the highest frequency of an affix-pattern combination for a given affix. The shortest affix with the high frequency is entered into the affix prediction data set. The affix generation module 120 may also determine that a most frequent affix-pattern combination for a selected affix has the same prediction as an affix that is contained within another shorter affix, the selected affix is then eliminated.

Figure 2:
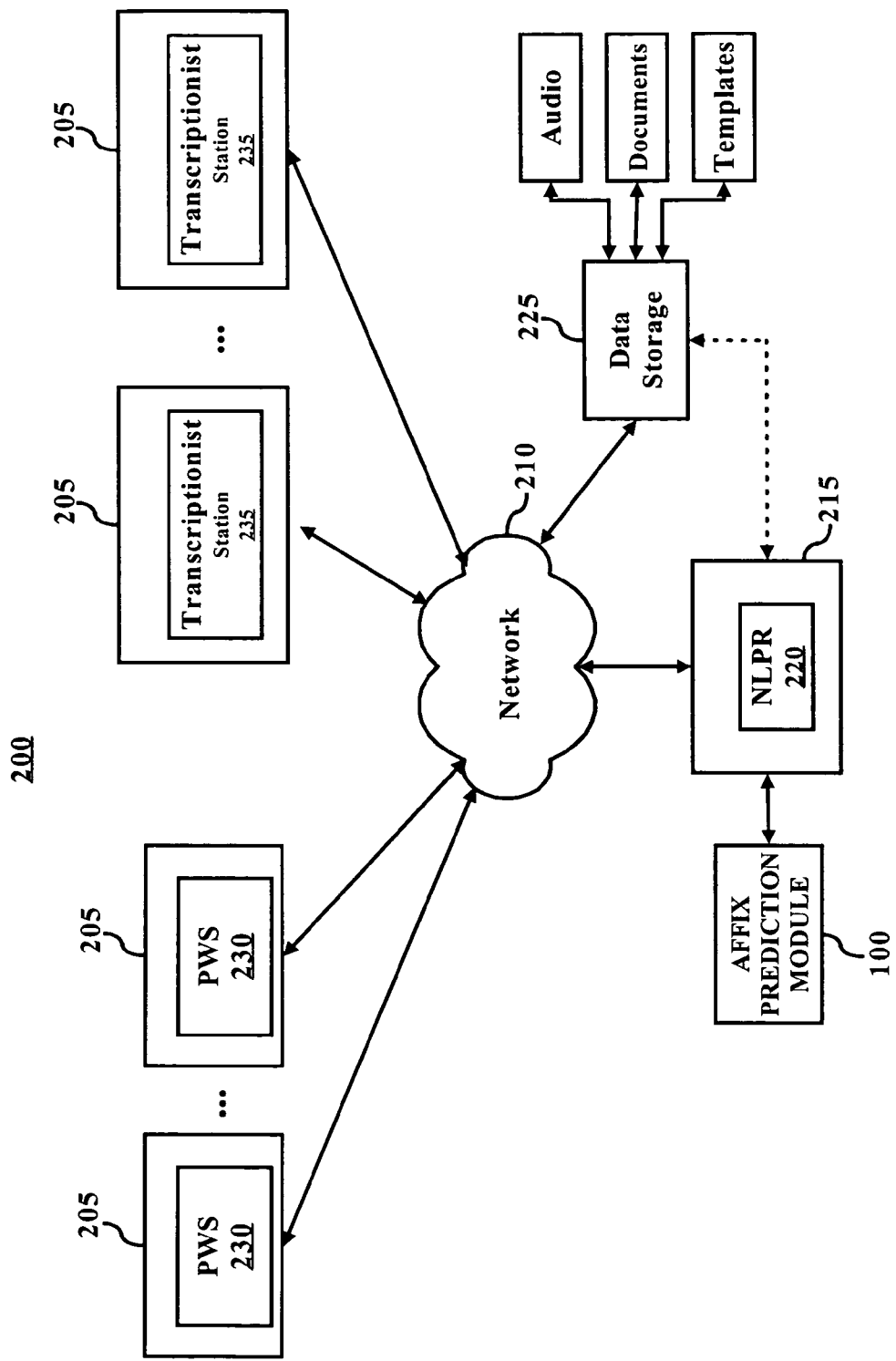
FIG. 2 illustrates a diagram of a system utilizing the affix prediction module in accordance with another embodiment of the invention.

FIG. 2 illustrates a natural language patient record (NLPR) system 200 utilizing the affix prediction module in accordance with yet another embodiment. It should be readily apparent to those of ordinary skill in the art that the system 200 depicted in FIG. 2 represents a generalized schematic illustration and that other components may be added or existing components may be removed or modified. Moreover, the system 200 may be implemented using software components, hardware components, or a combination thereof.

As shown in FIG. 2, the NLPR system 200 includes a plurality of workstations 205 interconnected by a network 210. The NLPR system 200 also includes a server 215 executing a computer readable version 220 of the NLPR system and data storage 225. The NLPR system 200 is a system for maintaining electronic medical records of patients, which is described in greater detail in co-pending U.S. patent application Ser. No. 10/447,290, entitled, "SYSTEM AND METHOD FOR UTILIZING NATURAL LANGUAGE PATIENT RECORDS," filed May 29, 2003, which has been incorporated by reference in its entirety.

The workstations 205 may be personal computers, laptops, or other similar computing element. The workstations 205 execute a physician workstation (PWS) client 230 from the NLPR system 200. The PWS client 225 provides the capability for a physician to dictate, review, and/or edit medical records in the NLPR system 200. While FIG. 2 is described in the realm of the medical field, it will be understood by those skilled in the art that the present invention can be applied to other fields of endeavor where users dictate, review and edit records in any domain.

The workstations 205 also execute a transcriptionist client 235 for a transcriptionist to access and convert audio files into electronic text. The NLPR system 200 may also use speech recognition engines to automatically convert dictations from dictators into electronic text.

The network 210 is configured to provide a communication channel between the workstations 205 and the server 215. The network 210 may be a wide area network, local area network or combination thereof. The network 210 may implement wired protocols (e.g., TCP/IP, X.25, IEEE802.3, IEEE802.5, etc.), wireless protocols (e.g., IEEE802.11, CDPD, etc.) or combination thereof.

The server 215 may be a computing device capable of providing services to the workstations 205. The server 215 may be implemented using any commonly known computing platform. The server 215 is configured to execute a computer readable version of the NLPR software 220. The NLPR software provides functionality for the NLPR system 200. The NLPR system 200 may receive audio files and/or documents by other network access means such as electronic mail, file transfer protocols, and other network transferring protocols.

The data storage 225 may be configured to interface with network 210 and provide storage services to the workstations 205 and the server 215. The data storage 225 may also be configured to store a variety of files such as audio, documents, and/or templates. In some embodiments, the data storage 225 includes a file manager (not shown) that provides services to manage and access the files stored therein. The data storage 225 may be implemented as a network-attached storage or through an interface through the server 215.

Figure 3:
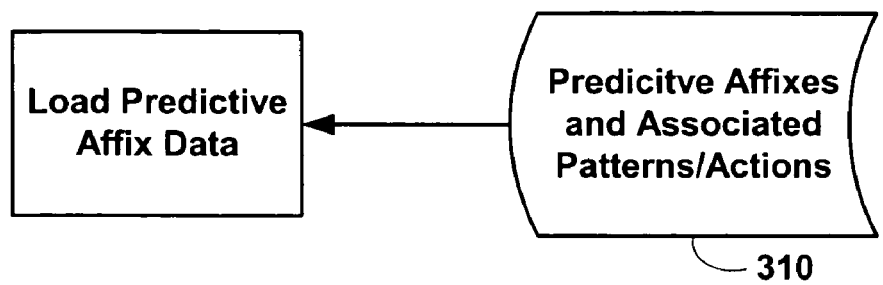
FIG. 3 shows a flow diagram of loading predictive data according one embodiment of the present invention.

FIG. 3 illustrates a flow diagram of loading predictive data 300 executed by the prediction module 120 according to one embodiment of the present invention. It should be readily apparent to those of ordinary skill in the art that this flow diagram 300 represents a generalized illustration and that other steps may be added or existing steps may be removed or modified.

As shown in FIG. 3, when invoked the prediction module 110 may retrieve a predictive data set of affixes 310 from the storage module 130. In the NLPR system, the predictive data set of affixes is loaded during NLPR system initialization. In other embodiments, the prediction module 110 may access the predictive data set 310 from a remote database, server or other similar persistent memory device.

In yet other embodiments, the predictive data set of affixes 310 may be tailored to a specific application. More specifically, the affix prediction module 100 may utilize a predictive data set of affixes 310 generated based on a legal lexicon for legal applications. Similarly, the affix prediction module 100 may be specifically tailored for specialties within a field. For example, predictive data set of affixes may be generated for oncology applications, gynecology applications, internal medicine applications, infectious diseases, etc. Accordingly, the affix prediction module 100 may be programmed to a specialty based on selecting the appropriate predictive data set.

Figure 4:
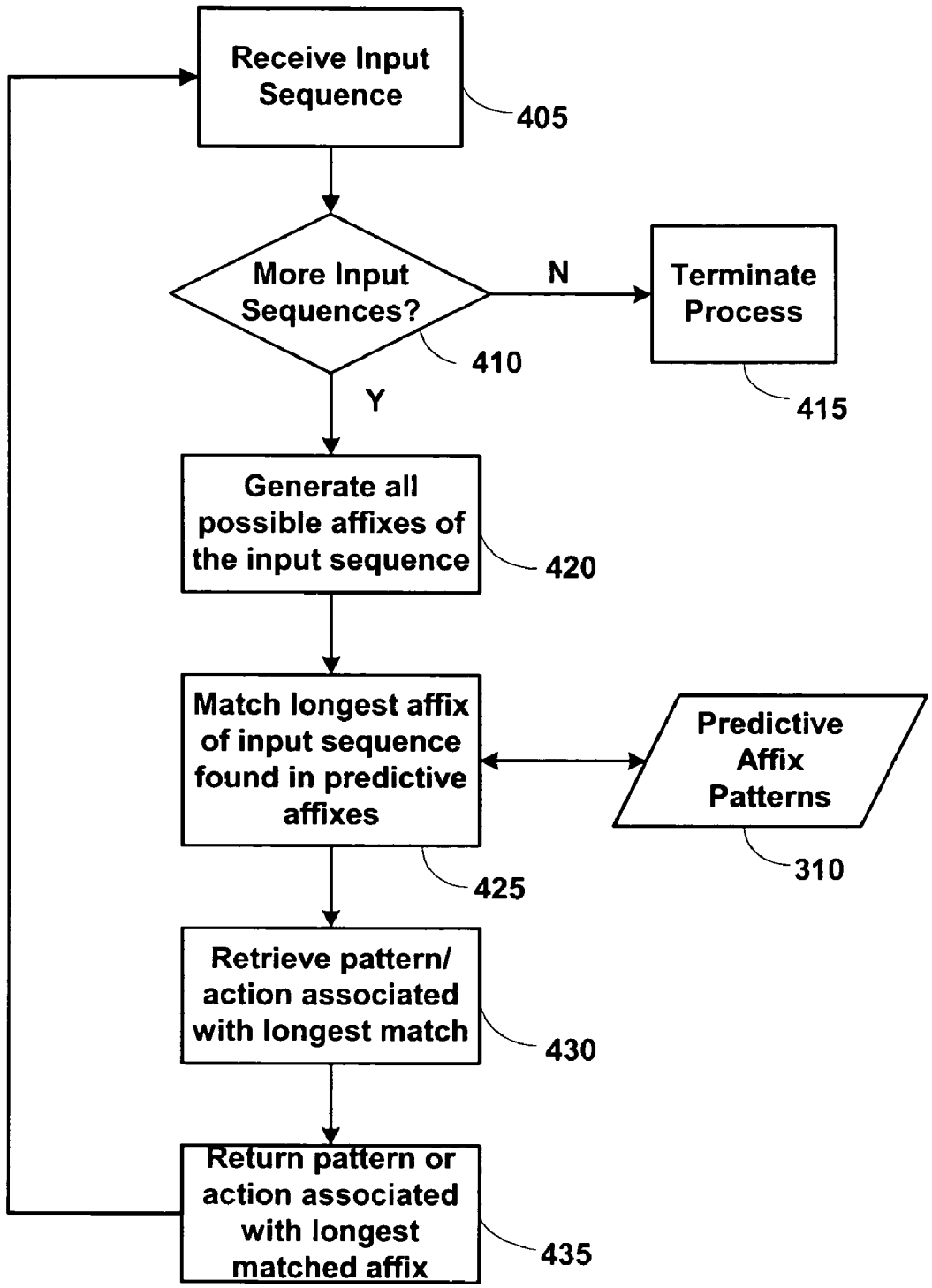
FIG. 4 shows a flow diagram of matching input data according to one embodiment of the present invention.

FIG. 4 illustrates a flow diagram of matching input data 400 implemented by the prediction module 110 according to one embodiment of the present invention. It should be readily apparent to those of ordinary skill in the art that this flow diagram 400 represents a generalized illustration and that other steps may be added or existing steps may be removed or modified.

As shown in FIG. 4, the prediction module 110 may be configured to receive an input sequence from an input file, in step 405. The prediction module 110, in step 410, may be configured to determine whether or not the last input sequence from the input file has been processed. For example, the prediction module may determine if an end-of-file character has been reached.

If the prediction module 110 determines that the end of input sequences has been reached, the prediction module 110 may terminate processing, in step 415. Although not explicitly shown, the prediction module 110 may return control to a calling program.

Otherwise, if the prediction module 110 determines that an input sequence has been retrieved for processing, the prediction module 110 may be configured to generate all possible affixes for the received input sequence, in step 420. The affix generation process done during prediction is identical to the process applied during the affix prediction data base generation phase. In an inflection prediction application, the affix generation (resp. recognition) process might consist of generating all possible suffixes of a given input term. For example, given the term "#diabetes#" (where '#' is the peripheral symbol), the affix generation (resp. recognition) process might generate the set of suffixes, from right-to-left of the input term: {#, #s, #se, #set, #sete, #seteb, #seteba, #setebai, #setebaid, #setebaid#}. In another embodiment, the affix generation (resp. recognition) process might incorporate prefixes or suffixes of the input term.

In step 425, the prediction module 110 may compare the generated affixes with the entries in the predictive data set 310. More specifically, the prediction module 110 may match the longest affix of the received input sequence with the predictive data set 110. A match is guaranteed since all sequences must contain peripheral symbols. In step 430, the prediction module 110 may retrieve the associated pattern/action associated with the longest match. In step 435, the retrieved pattern/action is returned to the calling program for further processing. Subsequently, the prediction module 110 retrieves the next input sequence from the input file in step 405.

Figure 5:
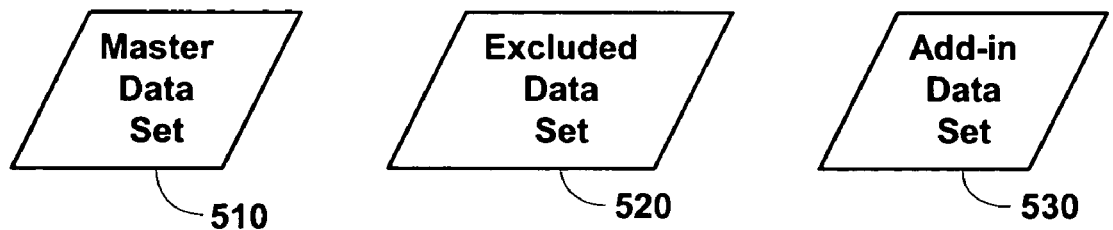
FIG. 5 shows a flow diagram of constructing data sets according to one embodiment of the present invention.

FIG. 5 illustrates a diagram of data sets 500 involved in generating the affix prediction data set 305 by the affix generation module 120 (shown in FIG. 1) according to one embodiment of the present invention. In certain embodiments, a master data set 510, an excluded data set 520, and an add-in data set may be used to generate the affix prediction data set 305. Each of the data sets comprises of triplets. A triplet comprises an affix sequence, a pattern associated with the affix sequence, and a frequency associated the affix sequence-pattern combination.

The master data set 510 may be configured to provide a basis for pattern generation. The excluded data set 520 may comprises a subset of triplets that are excluded from the master data set 510 that are not intended to undergo affix pattern generation. The add-in data set 530 may be configured to provide a set of triplets that are added "as-is" to the affix prediction data set 305.

The excluded data set 520 and the add-in data set 530 may be included at the option of the end-user or as a function of the application of the affix prediction module 100. More particularly, a master data set of word inflections may contain a large number of irregular inflections (e.g., run, runs, running, ran). In natural languages, irregular inflections are not productive, i.e., their patterning is not used, for example, in creating inflections of new words, and thereby may qualify to be included in the excluded data set. However, the irregular inflections would be included in the add-in data set to ensure that irregular inflections are found in the affix prediction data set.

Figure 6:
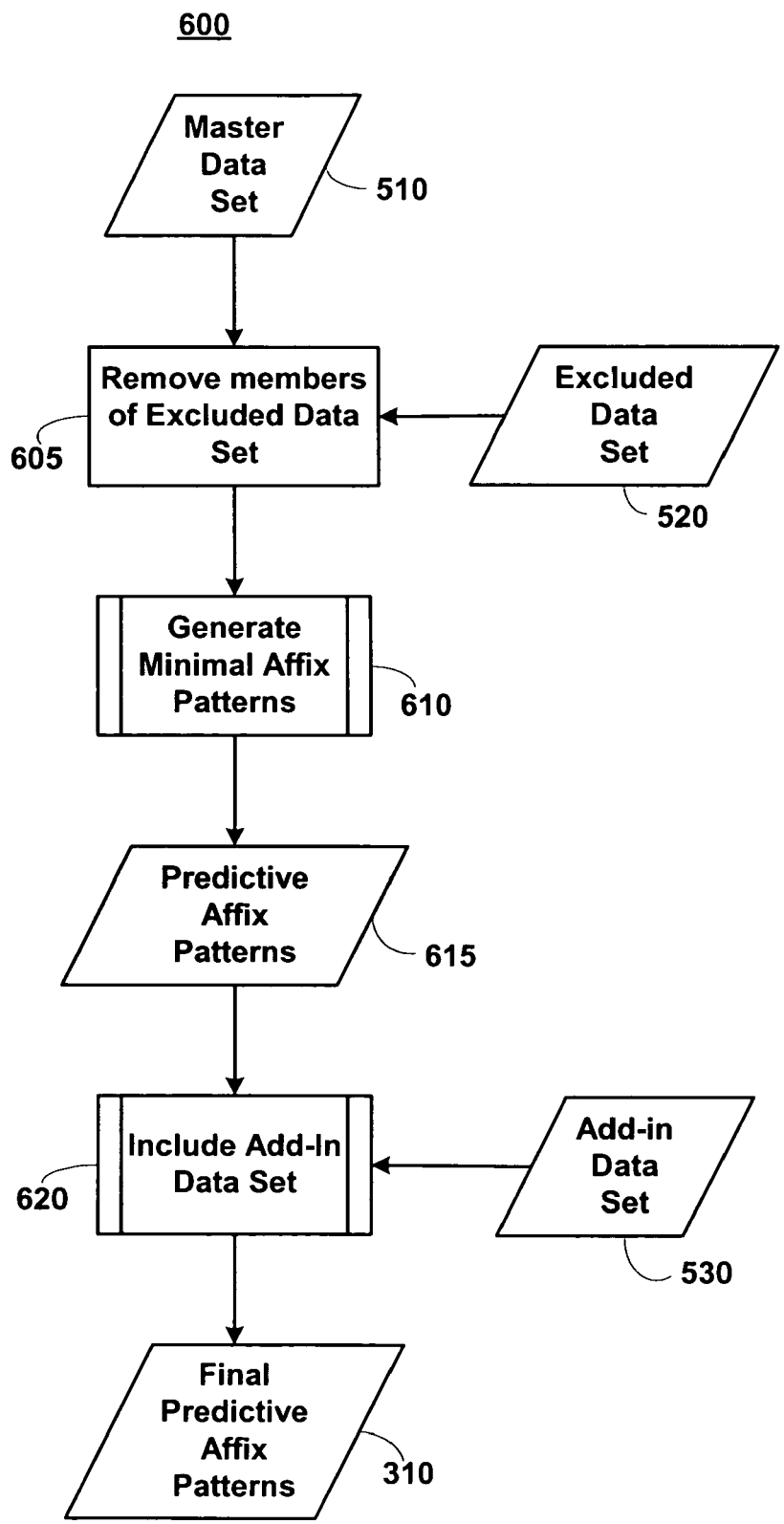
FIG. 6 shows a flow diagram of processing data sets according to one embodiment of the present invention.

FIG. 6 illustrates a flow diagram for the generation of the affix prediction data set 305 implemented by the affix generation module 120 according to another embodiment of the invention. It should be readily apparent to those of ordinary skill in the art that this flow diagram 600 represents a generalized illustration and that other steps may be added or existing steps may be removed or modified.

As shown in FIG. 6, the affix generation module 120 may be configured to receive the master data set 510 and the excluded data set 520 and remove the triplets of the excluded data set 520 from the master data set 510, in step 605. In other embodiments, the excluded data set 520 may not be processed to filter entries in the master data set 510. The inclusion of the excluded data set may be an end-user's discretion.

Figure 7:
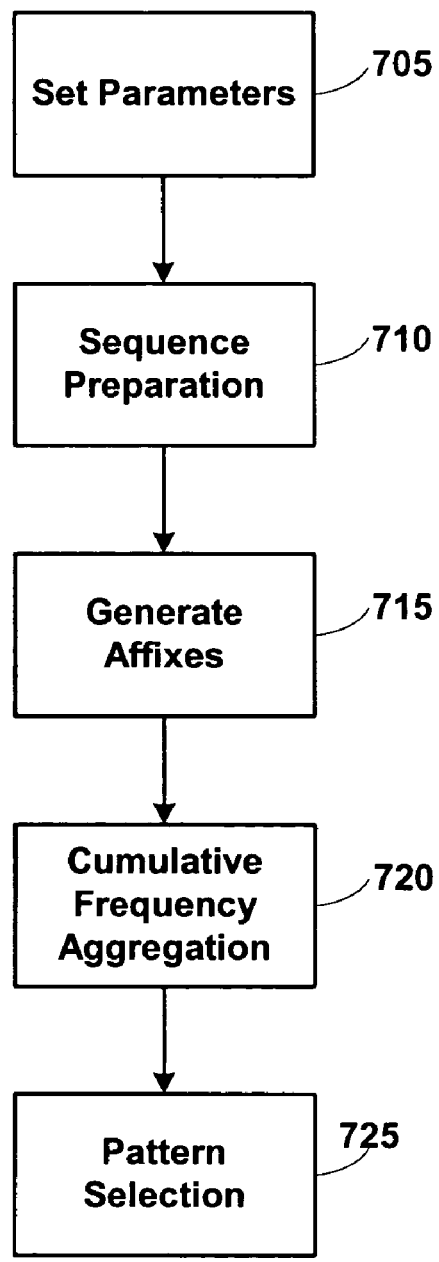
FIG. 7 shows a flow diagram of steps associated with element 80 of FIG. 4 according to one embodiment of the present invention.

In step 610, the affix generation module 120 may be configured to generate the minimal affix patterns associated with each triplet in the excluded or filtered master data set to generate a temporary predictive data set 615. FIG. 7 illustrates in greater detail the generation of the minimal affix patterns, as described herein below.

In step 620, the affix generation module 120 may be configured to add the add-in data set 530 to the temporary predictive data set 615 to created the final predictive affix patterns as the prediction data set 310. In yet other embodiments, the add-in data set 520 may not be processed. The processing of the add-in data set 520 may be an end-user option.

FIG. 7 illustrates a flow diagram 700 of the generation of the minimal affix patterns (shown in FIG. 6) as implemented by the affix generation module 120 according to yet another embodiment of the invention. It should be readily apparent to those of ordinary skill in the art that this flow diagram 700 represents a generalized illustration and that other steps may be added or existing steps may be removed or modified.

As shown in FIG. 7, the affix generation module 120 may be configured to set parameters, in step 705. More specifically, the affix generation module 120 may set threshold values for parameters such as length of the longest affix, lowest frequency affix-pattern combination allowed, and so forth. In certain embodiments, the affix generation module 120 may generate a graphical user interface for a user to set the threshold values.

In step 710, the affix generation module 120 may be configured to implement a sequence preparation on the filtered master data set. More particularly, the affix generation module 120 may pre-pend and/or post pend each term with a distinctive peripheral character or word to identify the beginning or end of a sequence.

In step 715, the affix generation module 120 may be configured to generate triplets for the characters and/or words of the corpus. More particularly, the affix generation module 120 may generate sequences of characters in a predefined order, i.e., an affix, from the characters and/or words of the corpus. For each sequence, the affix generation module 120 determines an associated pattern of the affixes, and the frequency of the affix-pattern combination. In other embodiments, the affix generation module 120 may eliminate an affix-combination pattern if it is longer than the pre-determined longest affix.

In step 720, the affix generation module 120 may be configured to maintain the frequency of each affix-pattern combination by keeping a count of the frequency of each affix-pattern combination and adding to the count for every new instance of that affix-pattern combination. In further embodiments, the affix generation module 120 may eliminate affix-pattern combinations for those combinations, which fall below the predetermined lower frequency pattern combination.

In step 725, the affix generation module 120 may select a subset of the generated triplets. More particularly, the affix generation module 120 may sort all triplets based on length of affix, the frequency, i.e., from shortest to longest affix and from lowest to highest frequency. The affix generation module 120 may then start from the shortest affix to determine the highest frequency of an affix-pattern combination for a given affix. The shortest affix with the high frequency is entered into the affix prediction data set. The affix generation module 120 may also determine that a most frequent affix-pattern combination for a selected affix has the same prediction as an affix that is contained within a shorter affix, but there are not affixes intervening between this shorter affix and the given affix with a different pattern, the selected affix is then eliminated.

Figure 8:
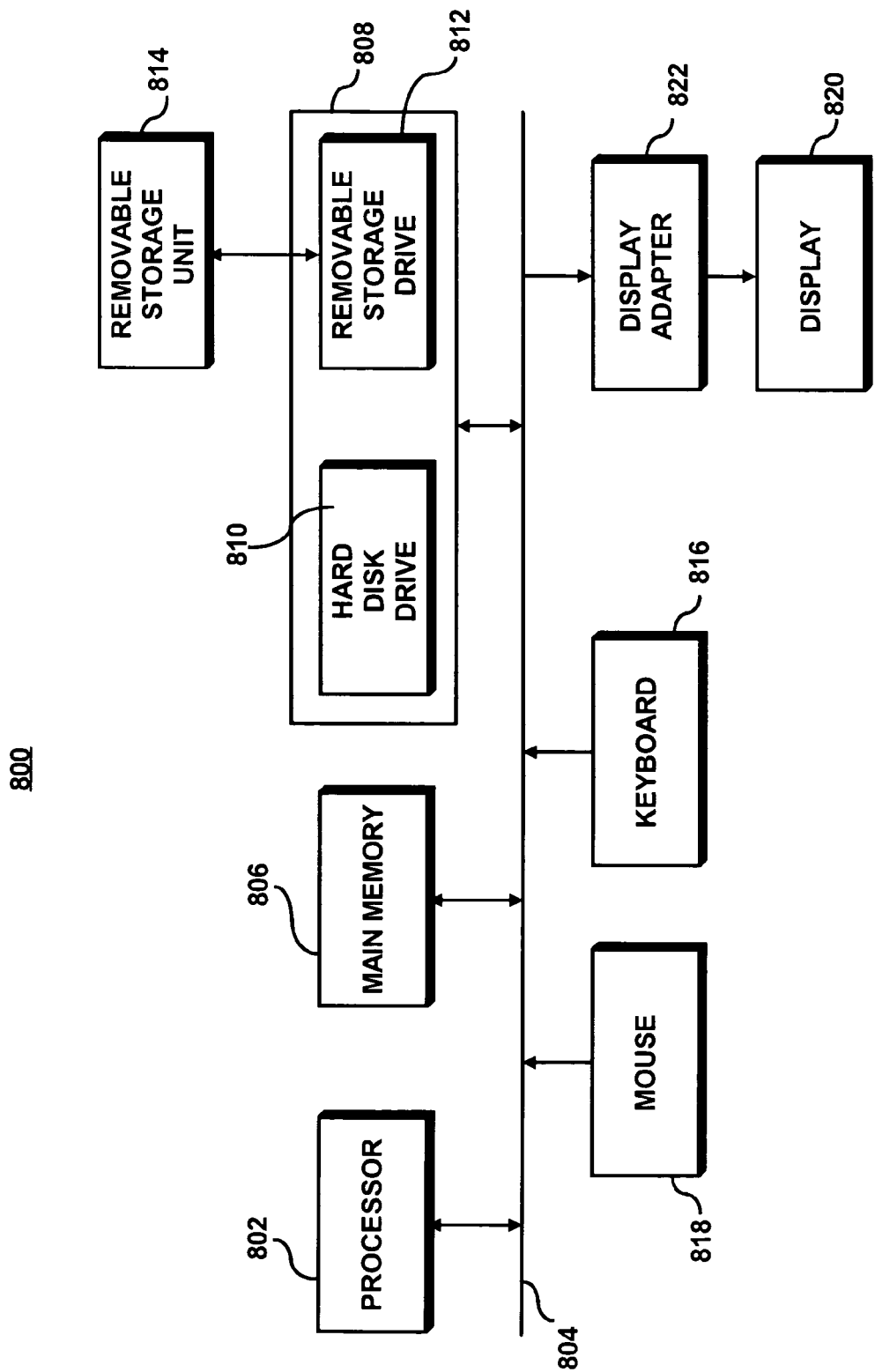
FIG. 8 illustrates a computer system implementing the affix prediction module in accordance with yet another embodiment of the invention.

FIG. 8 illustrates an exemplary block diagram of a computer system 1000 where an embodiment may be practiced. The functions of the affix prediction module 100 may be implemented in program code and executed by the computer system 800. The affix prediction module 100 may be implemented in computer languages such as PASCAL, C, C++, JAVA, and so forth.

As shown in FIG. 8, the computer system 800 includes one or more processors, such as processor 802, that provide an execution platform for embodiments of the affix prediction module. Commands and data from the processor 802 are communicated over a communication bus 804. The computer system 800 also includes a main memory 806, such as a Random Access Memory (RAM), where the software for the affix prediction module 80 may be executed during runtime, and a secondary memory 808. The secondary memory 808 includes, for example, a hard disk drive 820 and/or a removable storage drive 822, representing a floppy diskette drive, a magnetic tape drive, a compact disk drive, or other removable and recordable media, where a copy of a computer program embodiment for the affix prediction module 100 may be stored. The removable storage drive 822 reads from and/or writes to a removable storage unit 824 in a well-known manner. A user interfaces with the affix prediction module 100 with a keyboard 826, a mouse 828, and a display 820. The display adaptor 822 interfaces with the communication bus 804 and the display 820 and receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or other known program. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals arriving from the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It will be apparent to one of skill in the art that described herein is a novel system and method for predicting and accurately reproducing linguistic properties of character and word sequences using techniques involving affix data preparation, generation, and prediction. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. A method of prediction, the method comprising acts, performed via at least one processor, of:

determining from a selected input sequence a set of potential affixes, wherein the set of potential affixes comprises one or more potential affixes each being contained within the selected input sequence;

generating a predicted set of affixes by processing a master data set, wherein the processing of the master data set comprises removing entries in the master data set based on an excluded data set;

comparing the set of potential affixes with the predicted set of affixes comprising a set of predicted affixes;

determining that a group of one or more potential affixes from the set of potential affixes is in the predicted set of affixes; and selecting a matching affix from the group, wherein the matching affix is the potential affix within the group that has the greatest number of characters.

2. The method according to claim 1, further comprising an act of:

providing a pattern associated with the matching affix.

3. The method according to claim 1, further comprising an act of:
associating an action with the matching affix.

4. The method according to claim 3, further comprising an act of:
performing the action associated with the matching affix in response to selecting the matching affix from the group.

5. The method according to claim 4, wherein the action is providing an electronic mail address to an email client.

6. The method according to claim 1, further comprising acts of:
selecting affixes based on a shortest length and a highest frequency criteria to create the predicted set of affixes.

7. The method according to claim 6, further comprising an act of:
adding entries from an add-in data set to the predicted set of affixes.

8. The method according to claim 6, wherein said act of generating affixes comprises acts of:
determining a length of longest affix; and
determining a lowest frequency affix-pattern combination.

9. The method according to claim 8, wherein said act of generating affixes further comprises acts of:
pre-pending a peripheral symbol to each affix in the excluded master data set; and
post-pending the peripheral symbol to each affix in the excluded master data set.

10. The method according to claim 9, wherein generating a predicted set of affixes further comprises:
generating triplets, wherein each triplet comprising of comprises an affix, an associated pattern, and a frequency of occurrence of an affix-pattern combination, wherein the affix and associated pattern determine the affix-pattern combination.

11. The method according to claim 10, further comprising an act of:
determining a cumulative frequency of each affix-pattern combination.

12. The method according to claim 11, further comprising acts of:
sorting the generated triplets based on length and frequency of the affix in each triplet; and
determining a highest frequency for a selected affix-pattern combination that becomes entered into the affix prediction data set.

13. A method for generating a data set, the method comprising acts, performed via at least one processor, of:
receiving a corpus comprising a plurality of sequences;
generating a set of triplets based on the corpus, each triplet having an affix, an associated pattern, and a frequency of occurrence for an affix-pattern combination, wherein the affix and associated pattern in the triplet determine the affix-pattern combination of the triplet, and wherein the frequency of occurrence for an affix-pattern combination of each triplet is accumulated while processing each of the plurality of sequences of the corpus; and
selecting a subset of triplets as the data set, wherein a selection criteria is based on the length of each affix and the frequency of occurrence of each affix-pattern combination.

14. The method according to claim 13, wherein the act of generating the set of triplets comprises acts of:
setting a first parameter establishing a longest acceptable length for an affix in the subset of triplets; and
setting a second parameter establishing a lowest acceptable frequency of occurrence for an affix-pattern pair in the subset of triplets.

15. The method according to claim 14, further comprising acts of:
marking a beginning of each sequence in the corpus; and
marking an end of each sequence in the corpus.

16. The method according to claim 14, further comprising an act of:
eliminating a selected triplet based on the affix of the selected triplet exceeding the first parameter.

17. The method according to claim 14, further comprising an act of:
eliminating a selected triplet based on the associated frequency of occurrence of the affix-pattern combination not exceeding the second parameter.

18. The method according to claim 14, further comprising acts of:
sorting said set of triplets based on the length of the affix in each triplet in the set of triplets and frequency of occurrence of the affix-pattern combination in each triplet in the set of triplets;
determining a set of selected affixes based on highest frequency of occurrence and shortest length; and
providing said set of selected affixes as the data set.

19. The method according to claim 14, further comprising an act of:
eliminating a selected triplet from the set of triplets based on the associated affix of the selected triplet being predicted by a previously determined triplet in the set of triplets, wherein the associated affix of the previously determined triplet is shorter in length than the associated affix of the selected triplet.

20. The method of claim 13, wherein the associated pattern of each triplet is associated with an action.

21. The method of claim 20, wherein the action is loading an email client.

22. A system for predicting a pattern associated with an input sequence, said system comprising:
an affix generation module for:
receiving a corpus comprising a plurality of sequences;
generating an affix prediction data set, the affix prediction data set comprising a set of triplets based on the corpus, each triplet having an affix, an associated pattern, and a frequency of occurrence for an affix-pattern combination, wherein the affix and associated pattern determine the affix-pattern combination, and wherein the frequency of occurrence for each affix-pattern combination is accumulated while processing each of the plurality of sequences of the corpus; and
an affix prediction module for:
determining from the input sequence a set of affixes, wherein the set of affixes comprises one or more affixes each contained within the input sequence; and
predicting a pattern by
comparing the set of affixes with entries in the affix prediction data set
determining that a group of one or more affixes from the set of affixes is in the prediction data set;
selecting a matching affix from the group of one or more affixes, wherein the matching affix is the potential affix within the group that has the greatest number of characters; and
selecting a pattern associated with the matching affix as the predicted pattern.

23. The system according to claim 22, wherein the affix prediction module is further configured to provide an action associated with the matching affix.

24. The system according to claim 22, wherein the affix generation module is further configured to:

receive a set of affixes to be excluded; and
remove triplets from the set of triplets with affixes matching entries in the set of affixes to be excluded.

25. The system according to claim 22, wherein the affix generation module is further configured to remove a selected triplet from the set of triplets based on the associated pattern of the selected triplet being predicted by a second triplet, wherein the affix of the second triplet is shorter in length than the affix of the selected triplet.

26. The system according to claim 22, wherein the affix generation module is further configured to sort the set of triplets based on the length of each of the affixes and the frequency of occurrence of each of the affix-pattern combinations.

27. The system according to claim 26, wherein the affix generation module is further configured to remove a selected triplet from the set of triplets based on the associated pattern of the selected triplet being predicted by a second triplet, wherein the affix of the second triplet is shorter in length than the affix of the selected triplet to generate the affix prediction data set.

28. The system according to claim 26, wherein the affix generation module is further configured to remove a selected triplet from the set of triplets based on the affix of the selected triplet being predicted by a second triplet, wherein the affix of the second triplet is shorter in length than the associated affix of the selected triplet.

29. The system according to claim 28, wherein the affix generation module is further configured to add the entries of an add-in data set to the set of triplets to generate the affix prediction data set.

30. An apparatus for generating a data set, the apparatus comprising:
at least one processor programmed to:
receive a corpus, the corpus comprising a plurality of sequences;
generate a set of triplets based on the corpus, each triplet having an affix, an associated pattern, and a frequency of occurrence for an affix-pattern combination, wherein the affix and associated pattern determine the affix-pattern combination and wherein the frequency of occurrence for an affix-pattern combination of each triplet is accumulated while processing each of the plurality of sequences of the corpus; and
select a subset of triplets as the data set using a selection criteria based on the length of each affix in the set of triplets and the frequency of occurrence of each affix-pattern combination in the set of triplets.

31. The apparatus according to claim 30, wherein the at least one processor is programmed to generate the set of triplets by:
setting a first parameter establishing a longest acceptable length for an affix in the subset of triplets; and
setting a second parameter establishing a lowest acceptable frequency of occurrence for an affix-pattern pair in the subset of triplets.

32. The apparatus according to claim 31, wherein the at least one processor is further programmed to:
mark a beginning of each sequence in the corpus; and
mark an end of each sequence in the corpus.

33. The apparatus according to claim 31, wherein the at least one processor is further programmed to:
remove a selected triplet based on the affix of the selected triplet exceeding the first parameter.

34. The apparatus according to claim 31, wherein the at least one processor is further programmed to:
remove a selected triplet based on the associated frequency of occurrence of the affix-pattern combination not exceeding the second parameter.

35. The apparatus according to claim 31, wherein the at least one processor is further programmed to:
sort the set of triplets based on the length of the affix in each triplet in the set of triplets and frequency of occurrence of the affix-pattern combination in each triplet in the set of triplets;
determine a set of selected affixes based on highest frequency of occurrence and shortest length; and
provide said set of selected affixes as the data set.

36. The apparatus according to claim 31, wherein the at least one processor is further programmed to:
remove a selected triplet from the set of triplets based on the associated affix of the selected triplet being predicted by a previously determined triplet in the set of triplets, wherein the associated affix of the previously determined triplet is shorter in length than the associated affix of the selected triplet.

* * * * *

UNITED STATES PATENT AND TRADEMARK OFFICE
CERTIFICATE OF CORRECTION

| | | |
|---|---|---|
| PATENT NO. | : 8,024,176 B2 | Page 1 of 1 |
| APPLICATION NO. | : 10/787889 | |
| DATED | : September 20, 2011 | |
| INVENTOR(S) | : Alwin B. Carus et al. | |

It is certified that error appears in the above-identified patent and that said Letters Patent is hereby corrected as shown below:

At column 11, claim 9, lines 24-25, "pre-pending a peripheral symbol to each affix in the excluded master data set; and" should read --pre-pending a peripheral symbol to each affix; and--

At column 11, claim 9, lines 26-27, "post-pending the peripheral symbol to each affix in the excluded master data set." should read --post-pending the peripheral symbol to each affix.--

At column 11, claim 10, lines 30-31, "comprising of comprises" should read --comprises--.

Signed and Sealed this
First Day of November, 2011

David J. Kappos
*Director of the United States Patent and Trademark Office*